United States Patent
Hannan et al.

[11] 3,790,245
[45] Feb. 5, 1974

[54] DOUBLE-SIDED HOLOGRAPHIC REPLICAS

[75] Inventors: William James Hannan, Palm Beach Gardens, Fla.; Joseph Ralph Frattarola, Hightstown, N.J.

[73] Assignee: RCA Corporation, New York, N.Y.

[22] Filed: Oct. 12, 1972

[21] Appl. No.: 296,861

[52] U.S. Cl. .................................. 350/3.5, 352/233
[51] Int. Cl. .............................................. G02b 27/00
[58] Field of Search.. 350/3.5, 162 R, 162 S, 162 F, 350/162 ZP; 178/6.7; 179/100.3 V; 250/219 DD; 352/85 H, 232, 233

[56] References Cited
UNITED STATES PATENTS

| | | | |
|---|---|---|---|
| 3,565,978 | 2/1971 | Folger et al. | 350/3.5 |
| 3,619,025 | 11/1971 | Hannan | 350/3.5 |
| 3,430,966 | 4/1969 | Gregg | 179/100.3 V |

Primary Examiner—Ronald J. Stern
Attorney, Agent, or Firm—Glenn H. Bruestle; Birgit E. Morris; Arthur I. Spechler

[57] ABSTRACT

A double-sided, holographic replica comprises a web of transparent, thermoplastic, sheet material having a separate series of off-axis-recorded, phase-modulated holograms pressed into each of the opposite surfaces, respectively, of the web. Oppositely disposed (front and rear) holograms are such as to provide angularly displaced reconstructed images, respectively, when a monochromatic read-out beam is transmitted through the web. The double-sided holographic replica is made by first pressing the web and a first holographic master between a first pair of heated calender rollers to form one replica on one surface of the web, and then pressing the web, while thermoplastically adhered to the first master, and a second holographic master between a second pair of heated calender rollers to form another replica on the other surface of the web. The first and second masters are subsequently cooled and separated from the web.

6 Claims, 7 Drawing Figures

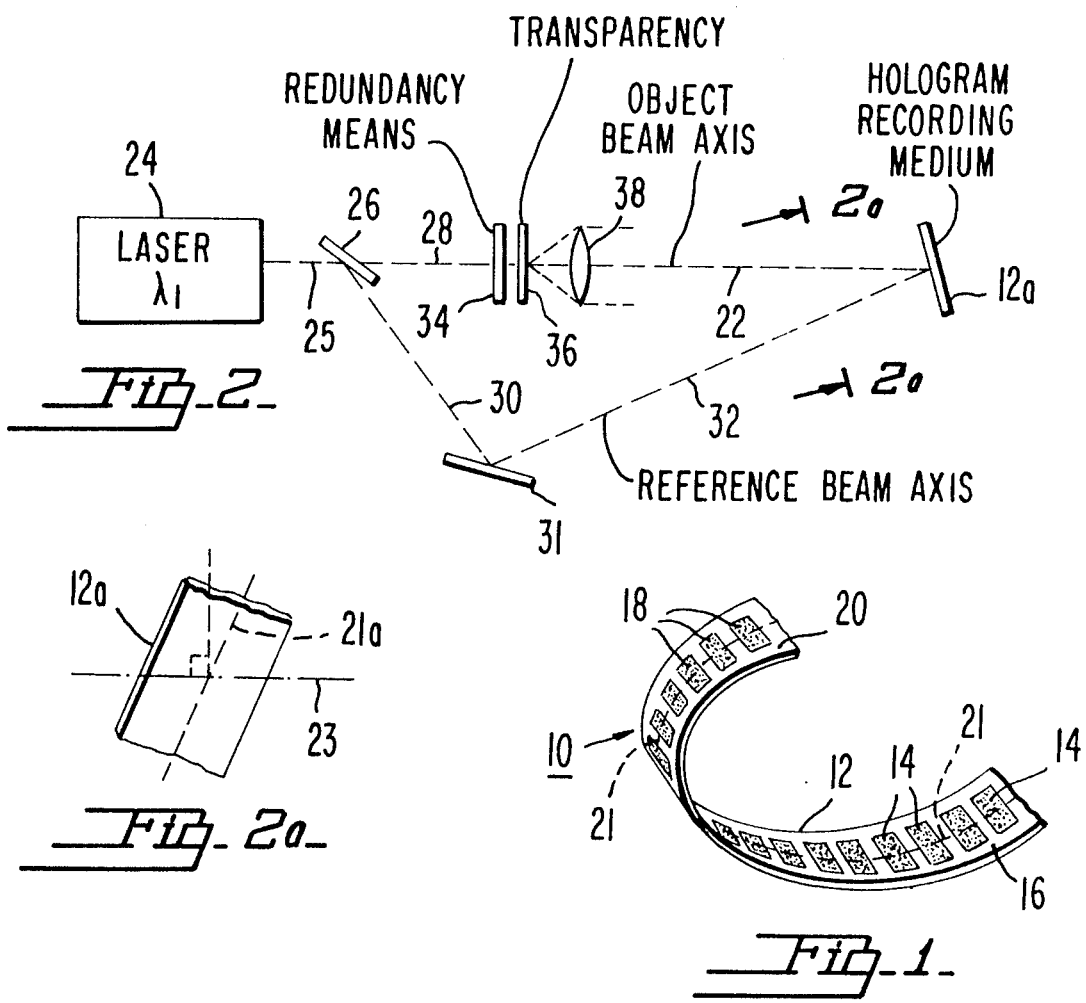
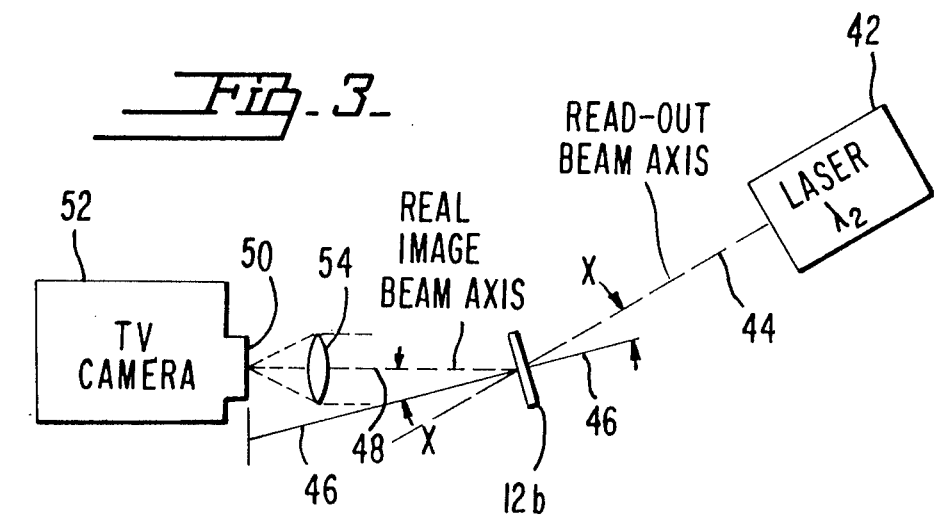

DOUBLE-SIDED HOLOGRAPHIC REPLICAS

BACKGROUND OF THE INVENTION

This invention relates generally to holograms, and, more particularly, to holographic replicas formed in the opposite surfaces of transparent sheet material, and to a method of making the same.

A hologram is a recording in the form of an interference fringe pattern of all the information in a wave front of light obtained from an object that is illuminated with spacially monochromatic light.

By the term "phase-modulated holograms," as used herein and in the appended claims, is meant holograms made by the technique of phase holography, which comprises, for example, projecting interference patterns, produced by the phase delay of two light beams, onto a recording medium that is developed to provide relief patterns, in a manner well known in the art.

It has been proposed to prepare phase-modulated holograms on a photoresist coated on a web substrate. When the photoresist is exposed directly with a holographic image of an object, and the photoresist is developed, the resulting phase-modulated hologram is termed an original hologram. A metal holographic master can be prepared from the original phase-modulated hologram by electroless plating and/or electroplating techniques to reproduce the holographic information on the metal master, in a manner known in the art, The advantage of preparing a metal master is that many holographic replicas can be pressed from a single metal master because of its dimensional stability.

It has also been proposed to make holographic replicas by pressing holographic relief patterns from a holographic master onto one surface of thermoplastic sheet material. Because of the prior-art method of recording and playing back phase-modulated holograms, however, it has not been possible previously to make a practical holographic replica by pressing holographic information onto the opposite surfaces of the same thermoplastic sheet material. The reason for this is that prior-art methods of making phase-modulated holograms comprised exposing the recording medium with a light interference pattern wherein the plane defined by the object beam and the reference beams was disposed perpendicularly to the longitudinal axis of the recording medium. By the term "longitudinal axis," as used herein is meant the imaginary axis of the hologram that is perpendicular to the plane defined by the object and reference beams in prior-art holograms, regardless of the actual position of this axis to the horizontal. If these prior-art relief patterns (replicas) of holograms were pressed onto the opposite surfaces of a transparent tape, for example, the reconstructed images of both the front and rear holograms would be superimposed on each other when the holographic replicas were played back, producing an undesirable result.

We have found that when the longitudinal axis of a holographic recording medium is disposed at an oblique angle (other than 90° or 0°) to the plane formed by the object and reference beams, an off-axis, phase-modulated hologram can be made by a method of holographic recording, herein referred to as a tilted off-axis recording, described in U. S. Pat. No. 3,619,052, issued on Nov. 9, 1971, to W. J. Hannan, the coinventor herein. If holographic masters are made from tilted off-axis, phase-modulated hologram recording media, then a transparent sheet material can be pressed on opposite surfaces with such masters, and the resulting double-sided holographic replica can be played back with a transmitted, monochromatic, read-out beam so that the projected, reconstructed image from the holographic replica on one surface of the sheet material is angularly displaced from, and does not interfere with, the projected reconstructed image from the holographic replica on the opposite surface of the sheet material.

SUMMARY OF THE INVENTION

A novel information recording medium comprises a transparent sheet material with a separate relief pattern on each of the opposite surfaces of the sheet material.

In a preferred embodiment of the novel recording medium, a different tilted off-axis holographic relief pattern is formed on each of the opposite surfaces of a web of transparent sheet material. Oppositely disposed (front and back) relief patterns are such as to provide angularly displaced reconstructed images, respectively, when a monochromatic read-out beam is transmitted through the sheet material.

In another embodiment of the novel recording medium, the relief pattern on at least one of the opposite surfaces of the sheet material is a tilted off-axis hologram.

The novel method of making double-sided-relief-pattern replicas comprises pressing a relief pattern, as from a first master of a tilted off-axis recording hologram, onto one surface of a thermoplastic sheet material at a temperature below the flow temperature of the thermoplastic material but sufficient to cause the sheet material to adhere temporarily to the first master, and then pressing a relief pattern, as from another master, onto the other side of the thermoplastic sheet material while the sheet material is still adhered to the first master. The thermoplastic sheet material is next cooled and the masters are separated therefrom.

BRIEF DESCRIPTION OF THE DRAWINGS

FIG. 1 is a fragmentary, perspective view of a novel, double-sided, holographic replica, showing a separate series of replicated holograms on opposite surfaces, respectively, of a flexible, transparent web of thermoplastic sheet material;

FIG. 2 is a schematic drawing of an arrangement of apparatus for recording a tilted off-axis hologram, corresponding to spacial information on a transparency, onto a hologram recording medium;

FIG. 2a is a cross section of the diagram shown in FIG. 2, taken along the line 2a—2a and viewed in the direction of the arrows;

FIG. 3 is a schematic diagram of an arrangement of apparatus for playing back a tilted off-axis recorded hologram to reconstruct an image of spacial information on a photosensitive imaging surface of a television camera;

DESCRIPTION OF THE PREFERRED EMBODIMENTS

Figure 4:
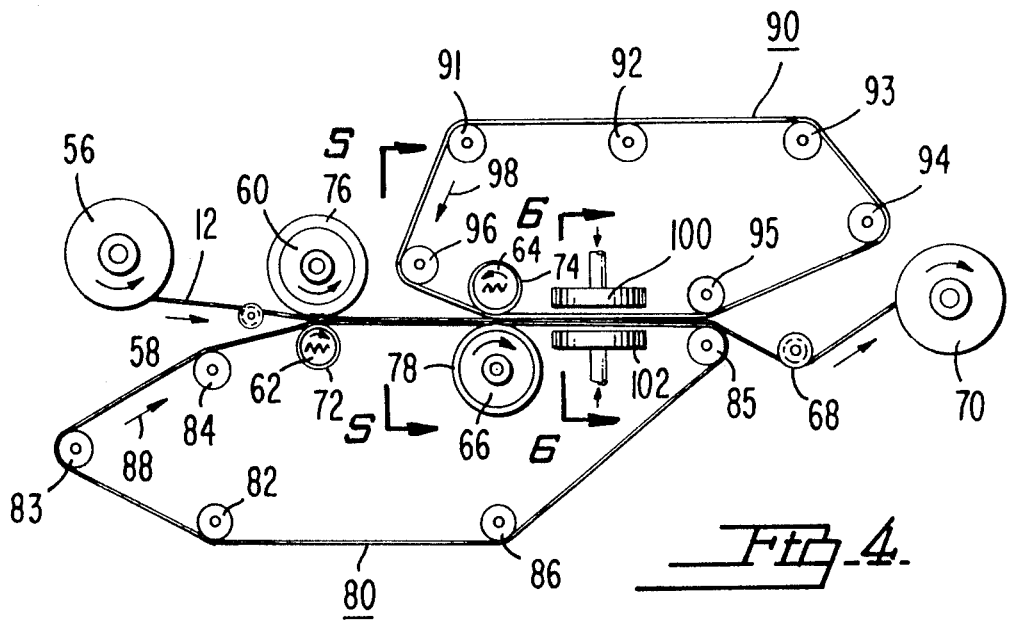
FIG. 4 is a schematic diagram of apparatus used in the method of making double-sided holographic replicas on a web of transparent, thermoplastic sheet material.

Referring now to FIG. 1 of the drawing, there is shown a fragmentary perspective view of one embodiment of a novel information recording medium in the form of a double-sided holographic replica 10. The holographic replica 10 comprises a web 12 of transparent sheet material with one series of phase-modulated holograms 14 pressed into one surface 16 of the web 12 and another series of phase-modulated holograms 18 pressed into an opposite surface 20 of the web 12.

The holograms 14 and 18 are relief patterns that are impressed in the surfaces 12 and 20 of the web 12, respectively, by metal masters in a novel method hereinafter to be explained. Each of the holograms 14 and 18 may be considered to have a longitudinal axis 21 extending in the intended direction of travel of the web 12. The web 12 is preferably of thermoplastic polymeric sheet material to provide a stable, flexible, transparent, and isotropic medium for the holograms 14 and 18 pressed therein. The web 12 is also of an optical quality and transparency at least equal to that of window glass.

A web of flexible, transparent, cast-vinyl, thermoplastic material, having a thickness of between 1 and 6 mils, has been found satisfactory for the web 12. Cast vinyl has been found superior to calendered vinyl in that the former provided better optical clarity and less noise and stress patterns under polarized light than the latter. A typical web 12 for storing information to be played back through a television receiver is about one-half inch wide with holographic information thereon in a series of relief patterns of about 5 × 10 mm². However, a web 12 of almost any width and length can be used provided that the holo-graphic information can be pressed therein. A typical web 12 is about 2 mils thick, and the peak to valley depth of the surface corrugations that form the phase-modulated holograms 14 and 18 (holographic contours) is on the order of between 5 and 2,000A.

Inasmuch as the holographic replica 10 will generally be used in conjunction with a web transport system, the web 12 should have physical characteristics such that it is not deformed under the tension of the transport system. For example, the web 12 should have a tensile strength of about 5,000 psi and a maximum elongation before rupture (at 25°C) of 5 percent. The flow temperature of the thermoplastic web 12, of the type described, is 155°C ± 1°C. A transparent, thermoplastic, vinyl material that has been found satisfactory for the holographic replica 10 is plasticized, polyvinyl chloride-vinyl acetate copolymer made by the Cadco Film Division of Cadillac Plastic and Chemical Co., Inc., Detroit, Mich., formulation No. C-102.

The holograms 14 and 18 are relief patterns impressed upon the web 12 by metal masters of tilted off-axis recorded holograms. Referring now to FIG. 2 of the drawing, there is shown an arrangement of apparatus for making a tilted off-axis recorded hologram. A holographic recording medium 12a, which can be in the form of a length of substrate tape or web coated with a suitable photoresist. The length of the web (recording medium 12a) lies in a plane perpendicular to the paper but extends in a direction that is oblique to the plane defined by the object and reference beam axes 22 and 32; that is, the longitudinal axis 12a of the recording medium 12a forms an angle other than 90° or zero degrees with the plane 23 that contains the object and reference beams, as shown in FIG. 2a. A laser 24 emits a beam 25 of optical energy of a first given wavelength $\lambda_1$. A partially reflecting mirror 26, called a beam splitter, divides the laser output beam 25 into two component beams 28 and 30. Beam 30, after reflection from a mirror 31, forms a reference beam, directed along the reference beam axis 32, that impinges upon the holographic recording medium 12a.

The light beam 28 is passed through redundancy means 34, which may be a diffuser, or preferably a phase grating of the type disclosed in U. S. Pat. No. 3,650,595. The optical energy emerging from the redundancy means 34 illuminates a transparency 36 having a spacial pattern of information thereon to be reproduced. If a Fresnel hologram is to be made, a convex lens 38 may be omitted and the optical energy emerging from the transparency 36 may be applied directly to the holographic recording medium 12a. If, however, a Fraunhofer hologram is to be made, the lens 38 is disposed in front of the transparency 36 at a distance equal to the focal length of the lens 38 so that the transparency 36 lies in the focal plane of the lens 38. In the latter case, the output of optical energy from the lens 38 is applied as the information beam about the information beam axis 22 to the holographic recording medium 12a. The developed holographic recording medium 12a provides a tilted off-axis hologram record 12b (FIG. 3) which can have a resolution of about 1 micron.

Referring now to FIG. 3, there is shown an arrangement of apparatus to play back the developed tilted off-axis hologram record 12b. A laser 42 produces a read-out beam of optical energy disposed about a read-out axis 44 at a second given wavelength $\lambda_2$ which may be the same as, or different from, the recording wavelength $\lambda_1$. The read-out beam impinges upon the hologram record 12b at an angle of incidence $x$, with respect to the normal 46 to the surface of the hologram record 12b.

The essential difference between the play-back technique of the tilted off-axis recorded hologram 12b and the prior-art play-back technique, other than the fact that the tilted off-axis hologram record 12b was recorded by a different technique, is in the orientation of the hologram record 12b with respect to the read-out beam axis 44 and a real image beam axis 48. The image represented by the hologram 12b is projected along the real image beam axis 48 and focused onto, for example, a sensitized surface 50 in a TV camera 52, by means of a lens 54. The surface 50 is at the focal distance of the lens 54; and the real image beam axis 48 forms an oblique angle $x$ with the normal 46 to the surface of the hologram record 12b. The plane defined by the read-out beam and real image beam axes 44 and 48, respectively, is oblique to the longitudinal axis of the hologram 12b. With the arrangement of apparatus shown in FIG. 3, scratches on the surface of the hologram record 12b will not be superimposed upon the reconstructed real image projected onto the surface 50 of the camera 52, as discussed in greater detail in the aforementioned U. S. Pat. No. 3,619,052.

If the hologram record 12b in FIG. 3 were a double-sided tilted off-axis recorded holographic replica, such as the replica 10 described in conjunction with FIG. 1, the holographic replica 10 could be played back by the play-back arrangement shown in FIG. 3 so that only one series of holograms, such as the holograms 14 on one surface, is imaged on the surface 50 of the camera 52. To image the other series of holograms, such as the holograms 18 on the other surface 20 of the holographic replica 10, onto the surface 50 of the camera 52 without interference from the holograms 18, the holographic replicas 10 would merely have to be reversed.

Referring now to FIG. 4 of the drawing, there is shown apparatus for the method of making the double-sided holographic replica 10 on the web 12 of transparent thermoplastic sheet material. The web 12 is unrolled from a supply roll 56 and directed: over a flanged guide roller 58, between a first pair of calender rollers 60 and 62, between a second pair of calender rollers 64 and 66, under a flanged guide roller 68, and rolled up on a take-up roll 70. The rollers 62 and 64 are heated, by any suitable means (not shown) and coated with layers 72 and 74, respectively, of silicone rubber. The rollers 60 and 66 are also covered with layers 76 and 78, respectively, of silicone rubber.

A first metal master 80 of a series of tilted off-axis recorded holograms, such as of the holograms 14 on the surface 16 of the web 12 illustrated in FIG. 1, is formed in an endless loop (as by welding, for example,) and disposed around rollers 82, 83, 84, 85, and 86 for rotation thereabout in the direction of the arrow 88 by any suitable motive means. A portion of the master 80 is also disposed between the first pair of calender rollers 60 and 62 and the second pair of calender rollers 64 and 66.

A second metal master 90 of a second series of tilted off-axis recorded holograms, such as of the holograms 18 on the surface 20 of the web 12, shown in FIG. 1, is also formed in an endless loop (as by welding, for example,) and disposed around rollers 91, 92, 93, 94, 95, and 96, for rotation thereabout in the direction of the arrow 98 by any suitable motive means. The master 90 passes between only the second pair of calender rollers 64 and 66. A blower 100 for blowing cool air onto the metal master 90 is disposed between the calender roller 64 and the roller 95. Another blower 102 is disposed between the calender roller 66 and the roller 85 for blowing cool air onto the metal master 80.

Figure 5:
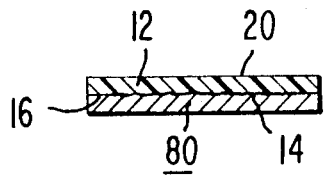
FIG. 5 is a cross section of a portion of the apparatus shown in FIG. 4, taken along the line 5—5 and viewed in the direction of the arrows.
Figure 6:
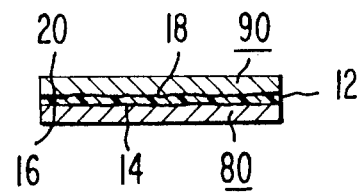
FIG. 6 is a cross section of a portion of the apparatus shown in FIG. 4, taken along the line 6—6 and viewed in the direction of the arrows.

The method of forming a separate series of replicas of different relief patterns in each of the opposite surfaces of the web 12 will now be described with the aid of the apparatus shown in FIG. 4. The web 12 is unrolled from the roll 56, guided over the flanged guide roller 58 and onto the silicone rubber surface of the calender roller 60. The lower surface 16 (FIG. 5) of the web 12 is brought into contact with the metal master 80 between the first pair of calender rollers 60 and 62. The temperature of the heated roller 62 is preferably about 130°C, that is, below the flow temperature of the thermoplastic web 12. The pressure between the first pair of calender rollers 60 and 62 can range between 10 and 200 psi. The web 12 is fed through the first pair of calender rollers 60 and 62 at a speed of about 4 inches per second. Under the aforementioned conditions, the metal master 80 presses impressions of the series of holograms 14 onto the surface 16 of the web 12, and the web 12 is temporarily thermoplastically adhered to the metal master 80 so that it cannot move with respect to it.

Next, the metal master 80, with the web 12 adhered to it, is moved over the silicone rubber surface of the roller 66 and the second metal master 90 is brought into contact with the surface 20 of the web 12 between the second pair of pressurized calender rollers 64 and 66. The calender roller 64 is heated to a temperature of preferably 100°C, and the pressure between the rollers 64 and 66 is in the range between 10 and 200 psi. Under these conditions, a second series of holograms 18 is impressed onto the surface 20 of the web 12. The metal masters 80 and 90 are now cooled by cool air from the blowers 102 and 100, respectively, to a temperature below 30°C. At this temperature the web 12 no longer adheres to the metal masters 80 and 90 and is moved under the flanged guide roller 68 and wound up on the take-up roll 70.

The thermoplastic web 12 should never be heated to the flow temperature thereof. The heat applied by the calender rollers, however, may be in the range from about 0.3 to 0.85 times the flow temperature of the web 12.

We have found that an improved double-sided holographic replica 10 is formed when the series of holograms for the opposite surfaces of the web 12 are applied in a sequential manner, that is, with two pairs of calender rollers, as shown in FIG. 4, rather than with only one pair, because it is relatively difficult to guide the web 12 simultaneously between two metal masters without unwanted slippage. Thus, by first guiding the web 12 onto the silicone rubber surface of the calender roller 60 and impressing the holograms 14 onto the surface 16 of the web 12 by the master 80, the web 12 adheres to the master 80 so that both the web 12 and the master 80 can be guided between the second pair of calender rollers 64 and 66 without any possible movement between the web 12 and the master 80. Under these conditions, the holograms 18 can be impressed on the surface 20 of the web 12 with accuracy and in the exact positions desired. The depth of the holographic impressions (relief patterns) may vary between 5 and 2,000A.

None of the aforementioned parameters is critical, and it is possible to vary them somewhat and still provide high-quality replicas. The temperature and pressure parameters will vary with the thickness of the thermoplastic web used, a somewhat higher temperature being necessary when a thicker web is used. We have also found that it is preferable to heat the calender roller in contact with the master rather than to heat the roller in contact with the replica (substrate) web. This latter procedure results in better reproduced holographic replicas. Also, the use of yieldable silicon rubber on the calender rollers tends to reduce unwanted slippage and provides improved holographic replicas.

The use of cast vinyls for the web 12 proved superior to calendered or extruded materials.

The blowers 100 and 102, which may be conduits having a plurality of openings through which compressed air can pass, are disposed parallel to the masters 80 and 90, respectively, along a substantial length thereof so as to cool the masters sufficiently and thereby minimize distortion or elongation of the web when separating the web from the masters. Although it is preferable to cool the masters 80 and 90 to at least 30°C before separating them from the web 12, the temperature of the masters 80 and 90 should be below 50°C before separation is attempted.

The web 12 should preferably have a maximum elongation prior to rupture of 5 percent at room temperature. Webs having greater elongation prior to rupture tend to have the replicated relief patterns distorted to such a degree as to degrade the image during play back. Also, the web should be flexible and capable of being wound on reels. While the examples described herein relate to pure vinyl material, the thermoplastic material may be in the form of a laminated tape, such as vinyl material coated on a "Mylar" base, if extra strength is desired.

Although the masters 80 and 90 are preferably made of nickel, other suitable metals or plastics may be employed.

Alternatively, instead of replicating a separate tilted off-axis recorded holographic series of holograms on each of the opposite surfaces of the thermoplastic web 12, one of the surfaces can have a relief pattern of audio information pressed therein rather than the second series of holograms.

I claim:

1. An information recording medium consisting of substantially homogeneous transparent sheet material having formed in each of the opposite surfaces thereof a separate relief pattern, each of said separate relief patterns comprising a tilted off-axis recorded transmission hologram formed by object and reference beams which define a plane oblique to the longitudinal axis of the hologram, said oppositely disposed relief patterns providing angularly displaced reconstructed images when a monochromatic read-out beam is transmitted through the sheet material.

2. An information recording medium as described in claim 1, wherein
said sheet material is a web of thermoplastic material.

3. An information recording medium as described in claim 1, wherein
said relief patterns having a depth in the range between 5 and 2,000A.

4. An information recording medium as described in claim 1, wherein
said sheet material has a thickness of between about 1 and 6 mils, and
said holograms have a resolution of about one micron.

5. An information recording medium as described in claim 1, wherein
said sheet material is cast vinyl, and
said holograms formed in said opposite surfaces of said sheet material are opposite each other.

6. An information recording medium as described in claim 5, wherein
said cast vinyl sheet material has an elongation before rupture of less than, or equal to, 5 percent at 25°C.

* * * * *